United States Patent
Farwaha et al.

(10) Patent No.: US 6,541,566 B1
(45) Date of Patent: Apr. 1, 2003

(54) PRESSURE SENSITIVE ADHESIVE COMPOSITIONS PREPARED WITH A STERICALLY HINDERED ALKOXYLATED SILANE

(75) Inventors: Rajeev Farwaha, Brampton (CA); Douglas N. Boutillier, Brampton (CA); Lien Phan, Mississauga (CA); Patrick J. Hayes, Brampton (CA); Arnold S. Baird, York (CA)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/166,050

(22) Filed: Oct. 5, 1998

(51) Int. Cl.$^7$ .............................. C08L 83/10; C08F 30/08
(52) U.S. Cl. ......................... 524/837; 526/279
(58) Field of Search ............................ 524/837; 526/279

(56) References Cited

U.S. PATENT DOCUMENTS

| | | | |
|---|---|---|---|
| 3,706,697 A | 12/1972 | Backderf | 260/29.2 M |
| 3,729,438 A | 4/1973 | Plesich et al. | 260/29.6 R |
| 4,526,930 A | 7/1985 | Keogh | 525/105 |
| 5,621,038 A * | 4/1997 | Chen et al. | 524/547 |
| 5,827,922 A * | 10/1998 | Chen et al. | 524/837 |
| 5,859,123 A * | 1/1999 | Kobayashi et al. | 524/805 |

FOREIGN PATENT DOCUMENTS

WO    WO 97/15624    5/1997    ........... C08L/43/04

* cited by examiner

Primary Examiner—Robert Dawson
Assistant Examiner—Jeffrey B. Robertson
(74) Attorney, Agent, or Firm—Thomas F. Roland, Esq.

(57) ABSTRACT

A pressure sensitive adhesive which is prepared by emulsion polymerizing an ethylenically unsaturated monomer and 0.01 to 2 pphm of a sterically hindered alkoxylated silane monomer. The silane crosslinks during film formation to provide the adhesive with increased shear strength without the disadvantage of decreased loop tack. The sterically hindered alkoxylated silane monomer has the structure $R^1$—Si—$(OR^2)_n(R^3)_{3-n}$ wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

12 Claims, No Drawings

PRESSURE SENSITIVE ADHESIVE COMPOSITIONS PREPARED WITH A STERICALLY HINDERED ALKOXYLATED SILANE

FIELD OF THE INVENTION

This invention relates to a pressure sensitive adhesive which is prepared by emulsion polymerizing an ethylenically unsaturated monomer and 0.01 to 2 pphm of a sterically hindered alkoxylated silane monomer. The alkoxy silane crosslinks during film formation to provide the adhesive with increased shear strength without the disadvantage of decreased loop tack.

BACKGROUND OF THE INVENTION

An important characteristic of pressure sensitive adhesives is the shear strength, also known as the cohesive strength or the internal strength of the adhesive, which measures the tendency of a pressure sensitive adhesive to flow or creep under an applied load. Especially in rolled paper applications where the pressure sensitive adhesives are used at temperatures considerably above their glass-transition temperatures, the shear strength must be greater than the adhesiveness to prevent the adhesive from creeping beyond the edges of the paper and bleeding through the paper which results in sheets of paper sticking together.

A crosslinked pressure sensitive adhesive sample or one with a high degree of entanglement (higher viscosity) would be expected to have a higher resistance to shear than a pressure sensitive adhesive sample with few entanglements (low viscosity). For these reasons, silane monomers have been used to provide crosslinking in polymer compositions. U.S. Pat. No. 3,729,438 describes an aqueous dispersion of a crosslinkable latex polymer prepared from vinyl acetate and a vinyl hydrolyzable silane. Upon removal of water from the latex polymer, the polymer further polymerizes or cures into a crosslinked polymer.

U.S. Pat. No. 3,706,697 describes an emulsion polymerization product of an acryloxyalkylsilane monomer with an alkyl acrylic ester wherein the silane is introduced to the polymerization after a portion of the other monomers are polymerized. International Patent Application WO 97/15624 describes curable aqueous compositions prepared with an emulsifiable polymer having pendant and/or terminal silyl ester groups and pendant terminal acidic groups neutralized with fugitive bases.

The disadvantages of using such alkoxy silane monomers, however, are that (1) the alkoxy silane monomers may crosslink during the emulsion polymerization and form grit; (2) the alkoxy silane monomers may hydrolyze during the emulsion polymerization so that even if the alkoxy silane monomer was polymerized the reactivity necessary for subsequent cross-linking would be destroyed; or (3) the alkoxy silane modified latex may hydrolyze during storage.

There continues to be a need for pressure sensitive adhesive compositions which provide the necessary shear strength at high temperature and high relative humidity environments, and provide increased shelf life without the disadvantages present in prior art pressure sensitive adhesives.

SUMMARY OF THE INVENTION

Accordingly, it is an object of the present invention to provide a pressure sensitive adhesive composition.

It is also an object of the invention to provide a pressure sensitive adhesive which bonds to a substrate and maintains sufficient shear strength.

It is another object of the invention to provide a pressure sensitive adhesive which may be applied to paper without bleeding through the paper or exhibiting excessive creep beyond the edges of the paper.

With regard to the foregoing and other objects, the present invention provides a pressure sensitive adhesive composition comprising the emulsion polymerization product of at least one ethylenically unsaturated monomer and from 0.01 to 2 parts per hundred monomer (pphm), preferably from about 0.05 to about 1 pphm of a sterically hindered alkoxylated silane monomer, wherein the sterically hindered alkoxylated silane monomer has the structure

$$R^1-Si-(OR^2)_n(R^3)_{3-n}$$

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

According to another aspect the invention provides a method of making a pressure sensitive adhesive, said method comprising (I) mixing an acidic metal salt curing agent with an aqueous emulsion polymer to form an adhesive, said polymer comprising the reaction product of at least one ethylenically unsaturated monomer and from 0.01 to 2 pphm of a sterically hindered alkoxylated silane monomer as described above; (II) applying the adhesive formed in Step (I) to a substrate; and (III) curing the adhesive with air or radio frequency to form a film.

An additional aspect of the invention provides a tape comprising a backing coated with the pressure sensitive adhesive composition as described above.

During film formation of the pressure sensitive adhesive of the invention, the sterically hindered alkoxysilane functionality of the silanes crosslink resulting in pressure sensitive adhesives which exhibit a significant increase in shear strength without the expected decrease in loop tack as compared to pressure sensitive adhesives prepared without sterically hindered alkoxylated silanes. This increase in shear strength allows pressure sensitive adhesives of the invention to be applied to paper under high relative humidity conditions (80% to 90%) wherein the paper is rolled without the adhesive creeping out or bleeding though the paper. Moreover, the presence of the sterically hindered alkoxy groups in the polymers minimizes crosslinking during emulsion polymerization and storage of the pressure sensitive adhesive.

DESCRIPTION OF THE INVENTION

The pressure sensitive adhesive compositions of the present invention are prepared from an aqueous emulsion polymer which is curable to form a film. The polymer is the reaction product of at least one ethylenically unsaturated monomer and a sterically hindered alkoxylated silane monomer. The sterically hindered alkoxylated silane is incorporated in the backbone of the polymer. The steric hindrance of the alkoxylated silane minimizes hydrolysis of the alkoxylated group during polymerization and storage. The aqueous emulsion polymer has acidic groups which are neutralized with a base. The release of the base upon application of the polymer frees the acid of the ethylenically unsaturated monomer for catalyzing the cure of the polymer.

While not wishing to be bound by any particular theory, the present inventors believe that crosslinking occurs between the sterically hindered alkoxysilane functionality on the polymer by means of a hydrolysis reaction to give silanols with subsequent condensation reaction between silanols and/or carboxyl groups on the polymer. Such crosslinking occurs during film formation of the pressure sensitive adhesive. The advantage of preparing the pressure sensitive adhesive with sterically hindered alkoxylated silane monomers is that crosslinking during the emulsion polymerization of the polymer and storage of the pressure sensitive adhesive, especially in the presence of carboxyl groups, is minimized.

The sterically hindered alkoxylated silane monomer is present in a critical amount of from 0.01 to 2 pphm, preferably 0.05 to 1 pphm. The sterically hindered alkoxylated silane monomer has the structure:

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

Suitable sterically hindered alkoxylated silane monomers for use in the invention include vinyltriisopropoxy silane, vinylpropyltriisopropoxy silane, vinylpropyltriisobutoxy silane, vinyltriisobutoxy silane, vinylpentyltri-t-butoxy silane, vinylbutyldimethyloctyl silane, vinylpropylmethyldipentoxy silane, vinylpropyltri-sec-butoxysilane. The sterically hindered alkoxylated silane monomer is preferably vinyltriisopropoxysilane.

Suitable ethylenically unsaturated monomers which are used to prepare the aqueous emulsion polymer include anhydrides, vinyl esters, alpha-olefins, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, and vinyl amide monomers. A combination of ethylenically unsaturated monomers may also be used. As used herein, "ethylenically unsaturated monomer" does not include ionic monomers.

Suitable anhydride monomers are, for example, maleic anhydride and itaconic anhydride. Suitable vinyl esters are, for example, vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate. Suitable alkyl esters of acrylic and methacrylic acid are, for example, methyl acrylate, methyl methacrylate, ethyl acrylate, ethyl methacrylate, propyl acrylate, butyl acrylate, pentyl acrylate, hexyl acrylate, and 2-ethyl hexyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable vinyl aromatic monomers preferably contain from 8 to 20 carbon atoms, most preferably from 8 to 14 carbon atoms. Examples of vinyl aromatic monomers are styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, 3-isopropenyl-α,α-dimethylbenzyl isocyanate, and halogenated styrenes.

Suitable acrylamide based monomers are, for example, acrylamide, N,N-dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sufonate, sodium vinyl sulfonate, sulfonated sytrene, etc. Suitable vinyl amide monomers are, for example, N-vinyl formamide, N-vinyl acetamide, etc.

In a preferred embodiment of the invention, the ethylenically unsaturated monomer is an alkyl acrylate monomer having the structure:

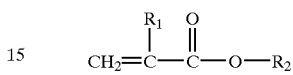

wherein $R_1$ is hydrogen or methyl and $R_2$ is an alkyl group having from 1 to 10 carbon atoms. The alkyl groups in the alkyl acrylate monomers can be straight chained or branched. The ethylenically unsaturated monomer is preferably selected from methyl methacrylate, butyl acrylate, vinyl acetate, 2-ethylhexyl acrylate, and combinations thereof.

Optionally, an ionic monomer may be used to prepare the aqueous emulsion polymer in addition to the ethylenically unsaturated monomer in order to increase mechanical stability of the latex. Suitable ionic monomers include, for example, α,β-ethylenically unsaturated $C_3$–$C_8$ monocarboxylic acids, α,β-ethylenically unsaturated $C_4$–$C_8$ dicarboxylic acids, including the anhydrides thereof, and the $C_4$–$C_8$ alkyl half esters of the α,β-ethylenically unsaturated $C_4$–$C_8$ dicarboxylic acids. Preferred ionic monomers are acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid, and itaconic acid. Most preferably, the ionic monomer is acrylic acid or methacrylic acid. The ionic monomer may be present in an amount of from about 0.01 to about 10 pphm, preferably from about 1 to about 5 pphm. Most preferably, the ionic monomer is present in an amount of from about 1.5 to about 3 pphm. A combination of ionic monomers may also be used.

The aqueous emulsion polymer is prepared with one or more surfactants or emulsifiers such as anionic and/or nonionic surfactants. The type and amount of surfactants are known in the art. Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols. Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. A combinations of surfactants may be used in preparing the aqueous emulsion polymer of the invention.

Water-soluble or water-dispersible polymerizable surfactants may also be used alone or in combination with non-polymerizable surfactant(s) to prepare the aqueous emulsion polymer of the invention. A preferred polymerizable surfactant for preparing the aqueous emulsion polymer is an allyl amine salt of alkyl benzene sulfonate denoted Structure I:

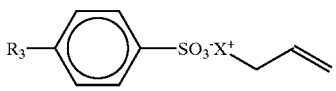

In Structure I, $R_3$ is an alkyl group having 1 to 20 carbon atoms, preferably 10 to 18 carbon atoms; and X+ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of alkyl benzene sulfonate is allyl amine salt of dodecylbenzene sulfonate.

Another preferred polymerizable surfactant is an allyl amine salt of alkyl ether sulfate denoted Structure II:

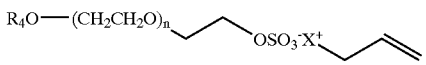

In Structure II, $R_4$ is an alkyl group having 1 to 20 carbon atoms, preferably 10 to 18 carbon atoms; n is an integer from 2 to 15, and $X^+$ is selected from $NH_3^+$, $NH_2R_8$ or $NR_8R_7$ wherein $R_6$ and $R_7$ are independently $C_1$–$C_4$ alkyl or hydroxyalkyl groups. Most preferably, the allyl amine salt of alkyl ether sulfate is allyl amine salt of laureth sulfate.

Another preferred polymerizable surfactant is an allyl amine salt of a phosphate ester denoted Structure III:

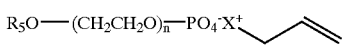

In Structure III, $R_5$ is an alkyl group having 1 to 20 carbon atoms, preferably 10 to 18 carbon atoms; n is an integer from 2 to 15, and $X^+$ is selected from $NH_3^+$, $NH_2R_6$ or $NR_6R_7$ wherein $R_6$ and $R_7$ are independently $C_1$–$C_4$ alkyl or hydroxyalkyl groups. Most preferably, the allyl amine salt of a phosphate ester is allyl amine salt of nonyl phenol ethoxylate (9 moles EO) phosphate ester. Preferred polymerizable surfactants are available under the trademarks POLYSTEP AU1, POLYSTEP AU7 and POLYSTEP AU9 from Stepan Company.

The aqueous emulsion polymer is prepared using free radical emulsion polymerization techniques which are known in the art. The aqueous emulsion polymer may be prepared by emulsion polymerization methods which are known in the art and include batch or continuous monomer addition or incremental monomer addition processes. As used herein, "batch" refers to a process whereby the entire amount of monomer is added in a single charge. As used herein, "continuous monomer addition" and "incremental monomer addition" refer to a process wherein optionally a minor portion of the monomer(s) is initially charged in the reactor and the remainder of the monomer(s) is then added gradually over the course of the reaction. The entire amount of the aqueous medium with polymerization additives can be present in the polymerization vessels before introduction of the monomer(s), or alternatively a portion of it can be added continuously or incrementally during the course of the polymerization.

Although the solids content and viscosity of the emulsion can vary, typical total solids content which is defined as the nonvolatile components of the emulsion is preferably in the range of from about 40 to about 70 weight percent, more preferably from about 50 to about 60 weight percent, based on the total weight of the emulsion.

The addition of an acidic, metal salt curing agent to the aqueous emulsion product after polymerization may be desired in order to accelerate the cure of the formulated adhesive. The preferred curing agents for use herein include acidic, metal salts selected from chromic nitrate, chromic perchlorate, aluminum nitrate, aluminum chloride, and para-toluene sulfonic acid. The amount of acidic metal salt curing agent which is added will depend on the rate of cure which is desired in the final product, however, a preferred range is from about 0.05 to about 4 weight percent, based on the total weight of the adhesive composition. A preferred acidic metal salt curing agent is zinc oxide.

The pressure sensitive adhesive compositions of the present invention may additionally contain other additives which include pigments such as titanium oxide, extenders such as flour, i.e., walnut shell flour, dispersing agents, defoaming agents, anti-freezing agents, preservatives, surfactants, sequestering agents, coalescing agents, defoaming agents, humectants, thickeners, defoamers, colorants, waxes, bactericides, fungicides, and fillers such as cellulose or glass fibers, clay, kaolin, talc, calcium carbonate and wood meal, and odor-modifying agents.

In preparing the pressure sensitive adhesive compositions of this invention, the aqueous polymer is mixed with the additive(s). The additive(s) may be added during the polymerization, after the polymerization and prior to the addition of the curing agent, or with the addition of the curing agent.

The pressure sensitive adhesive compositions may be applied to a wide variety of materials such as, for example, wood, cement, concrete, nonwoven or woven fabrics, aluminum or other metals, glass, ceramics, glazed or unglazed, tiles, polyvinyl chloride and polyethylene terephthalate and other plastics, plaster, stucco, roofing substrates such as asphaltic coatings, roofing felts, synthetic polymer membranes, and foamed polyurethane insulation. In addition, the adhesive compositions may be applied to previously painted, primed, undercoated, worn, or weathered substrates.

The pressure sensitive adhesives of the invention may be used in all types of tapes, labels, decals, packaging, electrical insulation, and surgical bandaging. The adhesives function to keep a backing or carrier surface to which the adhesive is applied in contact with a substrate to provide the substrate with resistance to corrosion (e.g., pipe wrapping tape), protection (e.g., surgical dressing), a mounting surface (e.g., double-faced tape), a closure or connection (e.g., diaper tape, splicing tape), or identification (e.g., labels, decals, stenciling).

The following nonlimiting examples illustrate further aspects of the invention.

EXAMPLE 1

Preparation of Adhesive without Silane

An all-acrylic latex was prepared without a silane monomer according to the following formula:

| Ingredients | Grams | Concentration in pphm |
|---|---|---|
| Initial water | 393 | 44 |
| Monomer Mixture | | |
| Water | 170 | 19 |
| Nonyl phenol ether Sulfate | 76 | 9 |
| TRITON X-305 | 5 | 0.6 |
| Methacrylic acid (MAA) | 18 | 2 |
| Lauryl Mercaptan | 2 | 0.2 |

-continued

| Ingredients | Grams | Concentration in pphm |
| --- | --- | --- |
| Butyl acrylate (BA) | 862 | 97 |
| Methyl Methacrylate | 27 | 3 |
| Catalyst Solution | | |
| Water | 86 | 10 |
| Sodium persulfate | 6 | 0.7 |

In a three liter vessel, equipped with a reflux condenser, addition funnels, and stirrer, the Initial charge was added to the reactor with agitation of 100 rpm. The reactor was heated to 78° C. A 92 gram portion of the Monomer Mixture and 20 grams of the Catalyst Solution were then charged to the reaction vessel and the reaction mixture was held for 20 minutes at 78° C. The remainder of the Monomer Mixture was metered into the reaction over a period of three hours. During the same three hour period, the Catalyst Solution was slow added to the reactor over a period of three hours. The reaction was held for 30 minutes at 78° C. Then 0.6 grams of tertiary butyl hydroperoxide in 5 grams water and 0.3 grams sodium formaldehyde sulfoxylate were added to the reactor. The pH of the latex was adjusted to 7.5 by the addition of 26.6% aqueous ammonium hydroxide solution.

The latex was determined to have 54.6% solids, average particle size of 187 nm, and Brookfield viscosity of 300 cps. The test results of the latex are summarized in Table I.

EXAMPLE 2

Preparation of an Adhesive with a Silane

A latex was prepared using the procedure and formula according to Example 1, except that 0.3 pphm of vinyltri-isopropoxysilane was added to the Monomer Mixture. The pH of the resulting latex was adjusted to 7.5 by the addition of a 26.6% ammonium hydroxide solution as in Example 1.

The latex was determined to have a particle size of 194 nm, a percent solids of 54.3%, a pH of 7.3, and a Brookfield viscosity of 276 cps. The test results of the latex are summarized in Table I.

EXAMPLE 3

Preparation of an Adhesive with Silane

A latex was prepared using the procedure and formula according to Example 1, except that 0.3 pphm of vinyl-tris-(2-methoxyethoxy) silane was added to the Monomer Mixture. The pH of the resulting latex was adjusted to 7.5 by the addition of a 26.6% ammonium hydroxide solution as in Example 1.

The latex was determined to have a particle size of 170 nm, percent solids of 54.5%, a pH of 7.3, and a Brookfield viscosity of 662 cps. The test results of the latex are summarized in Table I.

EXAMPLE 4

Preparation of an Adhesive with a Silane

A latex was prepared using the procedure and formula according to Example 1, except that 0.3 pphm of gamma-methacryloxypropyltri-methoxysilane was added to the Monomer Mixture. The pH of the resulting latex was adjusted to 7.5 by the addition of a 26.6% ammonium hydroxide solution as in Example 1.

The latex was determined to have a particle size of 189 nm, percent solids of 54.6%, a pH of 7.3, and a Brookfield viscosity of 384 cps. The test results of the latex are summarized in Table I.

EXAMPLE 5

Preparation of an Adhesive with a Silane

A latex was prepared using the procedure and formula according to Example 1, except that 0.1 pphm of vinyltri-isopropoxysilane was added to the Monomer Mixture. The pH of the resulting latex was adjusted to 7.5 by the addition of a 26.6% ammonium hydroxide solution as in Example 1.

The latex was determined to have a particle size of 186 nm, a percent solids of 54.3%, a pH of 7.13, and a Brookfield viscosity of 304 cps. The test results of the latex are summarized in Table I.

EXAMPLE 6

Preparation of an Adhesive with a Silane

A latex was prepared using the procedure and formula according to Example 1, except that 0.2 pphm of vinyltri-isopropoxysilane was added to the Monomer Mixture. The pH of the resulting latex was adjusted to 7.5 by the addition of a 26.6% ammonium hydroxide solution as in Example 1.

The latex was determined to have a particle size of 190 nm, a percent solids of 54.3%, a pH of 7.38, and a Brookfield viscosity of 306 cps. The test results of the latex are summarized in Table I.

EXAMPLE 7

Preparation of an Adhesive with a Silane

A latex was prepared using the procedure and formula according to Example 1, except that 0.4 pphm of vinyltri-isopropoxysilane was added to the Monomer Mixture. The pH of the resulting latex was adjusted to 7.5 by the addition of a 26.6% ammonium hydroxide solution as in Example 1.

The latex was determined to have a particle size of 186 nm, a percent solids of 54.3%, a pH of 7.29, and a Brookfield viscosity of 302 cps. The test results of the latex are summarized in Table I.

EXAMPLE 8

Preparation of an Adhesive with a Silane

A latex was prepared using the procedure and formula according to Example 1, except that 0.5 pphm of vinyltri-isopropoxysilane was added to the Monomer Mixture. The pH of the resulting latex was adjusted to 7.5 by the addition of a 26.6% ammonium hydroxide solution as in Example 1.

The latex was determined to have a particle size of 189 nm, a percent solids of 54.3%, a pH of 7.29, and a Brookfield viscosity of 302 cps. The test results of the latex are summarized in Table I.

EXAMPLE 9

Preparation of an Adhesive with a Silane

A latex was prepared using the procedure and formula according to Example 1, except that vinyl acetate, acrylic acid, and 2-ethylhexyl acrylate replaced methacrylic acid, methylmethacrylate, and butyl acrylate which were used in Example 1. In addition, 0.2 pphm of vinyltriisopropoxysilane was added to the Monomer Mixture. The pH of the resulting latex was 3.8.

The latex was determined to have a particle size of 190 nm, percent solids of 52.1%, and a Brookfield viscosity of 328 cps. The test results of the latex are summarized in Table I.

EXAMPLE 10

Preparation of an Adhesive with a Silane

A latex was prepared using the procedure and formula according to Example 1, except that vinyl acetate, acrylic acid, and 2-ethylhexyl acrylate replaced methacrylic acid, methylmethacrylate, and butyl acrylate which were used in Example 1. In addition, 0.2 pphm of gamma-methacryloxypropyltri-methoxysilane was added to the Monomer Mixture. The pH of the resulting latex was 3.8.

The latex was determined to have a particle size of 170 nm, percent solids of 51.0% and a Brookfield viscosity of 520 cps. The test results of the latex are summarized in Table I.

EXAMPLE 11

The adhesives prepared in Examples 1–10 were evaluated for shear strength, peel adhesion and loop tack. The test results are summarized in Table I. Test strips were prepared having a backing with a two-mil thick polyethylene terephthalate (MYLAR) coating thereon. A one-mil thick coating of the adhesive was applied to the polyethylene terephthalate coating and dried for 24 hours at approximately 72° F. and 50 percent relative humidity.

(1) Peel Adhesion

Ninety-degree peel strength testing or quick tack is done immediately after an adhesive strip is laid onto a test panel and allowed to stick under its own weight. In either case, peel adhesion is affected not only by the thickness and the modulus of both the adhesive and the backing but by the rate and angle of peel.

Peel adhesion measures the force required to remove a pressure sensitive adhesive specimen from a panel at a specified angle and speed. The values for peel adhesion reported herein are values expressed as grams per inch width of coated test sheet material determined by the following procedure: A one-inch width of the coated sheet is applied to a horizontal surface of a clean, stainless steel test plate with at least five lineal inches of the coated sheet material in firm contact with the steel plate. A hard (4.5 lb.) a rubber roller is used to firmly apply the strip and remove all discontinuities and entrapped air. The free end of the coated strip is then doubled back nearly touching itself so that the angle of removal of the strip from the steel plate will be 180°. The free end of the test strip (the one pulled) is attached to the adhesion tester scale (an Instron tensile tester). The test plate is then clamped in the jaws of the tensile testing machine capable of moving the plate away from the scale at a constant rate of 12 inches per minute. The scale reading result is recorded as the tape is peeled from the steel surface. Peel adhesion preferably requires at least 1600 g/in.

(2) Loop Tack

Loop tack is a measure of the force required to remove a standard adhesive coated MYLAR film loop from a standard stainless steel plate after only nominal contact of the test strip with the steel plate in the absence of significant pressure. A one by five-inch strip of one mil MYLAR film coated with the sample adhesive is formed into a loop with the adhesive side out, and the loop is applied to a stainless steel plate until the tape loop contacts 1 square inch of surface area on the plate. The loop is retracted from the plate at a rate of 12 inches per minute, and loop tack is defined as the force observed when the final portion of the adhesive strip separates from the test plate. Specifically, the steel test plate is inserted in the lower jaws of a Loop Tack tester while the upper portion of the loop is clamped in the upper jaw of the tester and is moved downward toward the test plate at a rate of 12 inches per minute. When the test loop has contacted one square inch of test plate area, the direction of travel of the upper jaw of the Loop Tack tester is reversed and set to remove the loop from the plate at a rate of 12 lineal inches per minute. Loop Tack is reported in psi and is preferably greater than 2 psi.

(3) Shear Strength (Holding Power)

Shear strength, or the internal strength of the adhesive mass, which resists the tendency to flow or creep under an applied load, is important in the performance of pressure-sensitive adhesives. Because pressure sensitive adhesives are not crystalline and are used at temperatures considerably above their glass-transition temperatures, they are capable of viscous flow and should exhibit creep.

Shear strength measures the force required to pull pressure sensitive tape from a standard flat surface in a direction parallel to the surface to which it has been affixed. It is measured in terms of the time required to pull a standard area of tape from a test panel under a standard load. Each test is conducted on an adhesive coated strip applied to a standard stainless steel panel in a manner such that a one inch by one inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 1000 grams applied as a hanging weight from the free end of the test strip. The elapsed time required for each test strip to separate from the test panel is recorded as shear strength. Shear strength is reported in hours and is preferably greater than 2 hours.

TABLE I

| Adhesive | Silane | Amount Silane (pphm) | Peel Adhesion (g/in) | Shear Strength (hrs) | Loop Tack (psi) |
|---|---|---|---|---|---|
| Comparative Ex. 1 | None | None | 1291 | 1.5 | 2.55 |
| Ex. 2 | vinyltriiso-propoxysilane | 0.3 | 1783 | 4.6 | 2.21 |
| Comparative Ex. 3 | vinyl-tris-(2-methoxyethoxy)silane | 0.3 | 933 | 6.5 | 1.86 |
| Comparative Ex. 4 | gamma-methacryloxypropyltrimethoxysilane | 0.3 | 515 | 20.0 | 1.17 |
| Ex. 5 | vinyltriiso-propoxysilane | 0.1 | 1674 | 2.6 | 2.46 |
| Ex. 6 | vinyltriiso-propoxysilane | 0.2 | 1341 | 3.7 | 2.16 |
| Ex. 7 | vinyltriiso-propoxysilane | 0.4 | 1780 | 8.2 | 2.48 |
| Ex. 8 | vinyltriiso-propoxysilane | 0.5 | 1321 | 12.5 | 1.81 |
| Ex. 9 | vinyltriiso-propoxysilane | 0.2 | 894 | 3.1 | 2.40 |
| Ex. 10 | gammamethacryl-oxypropyltrimethoxy-silane | 0.2 | 443 | 2.7 | 1.85 |

The test results in Table I show that the latexes prepared in Examples 2, 5, 6, 7, 8 and 9 with the silane monomer having sterically hindered groups (vinyltriisopropoxysilane) exhibited a better balance of properties as compared to Example 1 which wasn't prepared with a silane and Examples 3, 4 and 10 which were prepared with nonsterically hindered alkoxylated silanes. Furthermore, the data in Table I shows that the latex of Example 2 which was prepared with 0.3 pphm of a sterically hindered alkoxylated silane outperformed the latexes prepared with the same level of a nonsterically hindered alkoxylated silane in terms of peel adhesion and loop tack. The latex of Example 2 was significantly above 1600 g/in for peel strength and loop tack was above 2.0 psi. In contrast, the latexes of Examples 3 and 4 had a peel strength of 933 g/in and 515 g/in, respectively, and loop tack in both Examples 3 and 4 was less than 2.0 psi.

In reference to Examples 9 and 10, the test results in Table I shows that Example 9 which was prepared with a silane according to the invention exhibited significantly increased loop tack and peel adhesion as compared to Example 10 which was prepared with a non-sterically hindered silane. It is noted that Examples 9 and 10 were prepared with different ethylenically unsaturated monomers than used in the previous examples. The choice of ethylenically unsaturated monomers affects peel adhesion values.

EXAMPLE 12

Evaluation of Metal Salt Curing Agent in Adhesive with Silane

Zinc oxide in an amount of 0.25%, based on the total weight of latex, was added to the latex prepared in Example 5 with 0.1 pphm of vinyltriisopropoxysilane. The latex was evaluated according to the procedures set forth in Example 11. The test results indicated a shear strength of 14 hours, a loop tack of 1.48 psi, and a peel adhesion of 1605 g/in, as compared to a shear strength of 2.6 hours, a loop tack of 2.46 psi, and a peel adhesion of 1674 g/in. from Example 5. Thus, the metal salt curing agent significantly increases the shear strength of the adhesive at the expense of loop tack which is advantageous in certain pressure sensitive applications.

While the invention has been described with particular reference to certain embodiments thereof, it will be understood that changes and modifications may be made by those of ordinary skill within the scope and spirit of the following claims.

What is claimed is:

1. A pressure sensitive adhesive composition comprising the emulsion polymerization product of at least one ethylenically unsaturated monomer, from 0.01 to 10 pphm of an ionic monomer selected from the group consisting of acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid and itaconic acid;

and from 0.01 to 2 pphm of a sterically hindered alkoxylated silane monomer, wherein the sterically hindered alkoxylated silane monomer has the structure

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

2. The pressure sensitive adhesive according to claim 1 wherein the sterically hindered alkoxylated silane monomer is selected from the group consisting of vinyltriisopropoxy silane, vinylpropyltriisopropoxy silane, vinylpropyltriisobutoxy silane, vinyltriisobutoxy silane, vinylpentyltri-t-butoxy silane, vinylbutyldimethyloctyl silane, vinylpropylmethyldipentoxy silane, vinylpropyltri-sec-butoxysilane, and combinations thereof.

3. The pressure sensitive adhesive according to claim 2 wherein the sterically hindered alkoxylated silane monomer is vinyltriisopropoxysilane.

4. The pressure sensitive adhesive according to claim 1 wherein the ethylenically unsaturated monomer is selected from the group consisting of vinyl esters, α-olefins, anhydrides, alkyl esters of acrylic and methacrylic acid, substituted or unsubstituted mono and dialkyl esters of unsaturated dicarboxylic acids, vinyl aromatics, unsubstituted or substituted acrylamides, cyclic monomers, monomers containing alkoxylated side chains, sulfonated monomers, vinyl amide monomers, and combinations thereof.

5. The pressure sensitive adhesive according to claim 4 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonanoate, vinyl decanoate, vinyl pivalate, and vinyl versatate.

6. The pressure sensitive adhesive according to claim 4 wherein the alkyl esters are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate.

7. The pressure sensitive adhesive according to claim 6 wherein the substituted or unsubstituted mono and dialkyl esters of unsaturated dicarboxylic acids are selected from the group consisting of substituted and unsubstituted mono and dibutyl, mono and diethyl maleate esters, and the corresponding fumarates of such esters.

8. The pressure sensitive adhesive according to claim 4 wherein the vinyl amide monomers are selected from the group consisting of N-vinyl formamide and N-vinyl acetamide.

9. The pressure sensitive adhesive according to claim 4 wherein the vinyl aromatic monomer is selected from the group consisting of styrene, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

10. The pressure sensitive adhesive according to claim 4 wherein the ethylenically unsaturated monomer is selected from the group consisting of methylmethacrylate, butyl acrylate, 2-ethylhexyl acrylate, vinyl acetate, and combinations thereof.

11. The pressure sensitive adhesive according to claim 1 wherein the ionic monomer is selected from the group consisting acrylic acid and methacrylic acid.

12. The pressure sensitive adhesive according to claim 1 wherein the ionic monomer is present in an amount of from about 1 to about 5 pphm.

* * * * *